United States Patent [19]

Zucchetti

[11] 4,163,460

[45] Aug. 7, 1979

[54] SINGLE-CONTROL TYPE OF HOT COLD WATER MIXER

[75] Inventor: Mario Zucchetti, Gozzano, Italy

[73] Assignee: Zucchetti Rubinetteria S.p.A., Gozzano, Italy

[21] Appl. No.: 816,673

[22] Filed: Jul. 18, 1977

[30] Foreign Application Priority Data

Jul. 26, 1976 [IT]  Italy .............................. 21837/76[U]

[51] Int. Cl.$^2$ ............................................. F16K 11/06
[52] U.S. Cl. ................................. 137/625.4; 137/636.3
[58] Field of Search .............. 137/625.4, 636.3, 625.41

[56] References Cited

U.S. PATENT DOCUMENTS

| | | | |
|---|---|---|---|
| 3,526,250 | 6/1969 | Miller | 137/625.4 |
| 3,667,503 | 6/1972 | Farrell et al. | 137/625.4 |
| 3,680,592 | 8/1972 | Hayman | 137/625.4 |
| 3,747,638 | 7/1973 | Manoogian et al. | 137/625.4 |
| 3,854,493 | 12/1974 | Farrell | 137/625.4 |
| 3,882,897 | 5/1975 | Manoogian et al. | 137/625.4 |

*Primary Examiner*—Martin P. Schwadron
*Assistant Examiner*—A. Michael Chambers
*Attorney, Agent, or Firm*—Fleit & Jacobson

[57] ABSTRACT

A hot and cold water mixer comprising: a mixer body defining a hot water inlet conduit and a cold water inlet conduit opening towards a mixing chamber communicating with a water delivery orifice; the mixing chamber has therein a mixing unit operably driven, by a control handle or knob, between a closed position, a hot water or cold water open position, and a mixing position. The mixing unit comprises a stationary disc of ceramic material having first and second apertures communicating with said hot and cold water inlet conduits, and a movable block of ceramic material having a flat face sealingly sliding against a flat face of said disc; said block has a cavity opening to said flat face and respectively to the side surface to define a water passage from said inlet conduits to the mixing chamber, the width of the block cavity being larger than the distance or spacing between the apertures in said ceramic disc in order to communicate with either or partially with both the apertures in said disc.

1 Claim, 5 Drawing Figures

SINGLE-CONTROL TYPE OF HOT COLD WATER MIXER

This invention relates to a single-control type of hot and cold water mixer.

Several designs of single-control hot and cold water mixers are known, such as those providing the use of one or more movable members, operable by a single control handle either for opening or mixing hot water with cold water or closing the mixer. Such prior art mixer units are of a complicated construction due to the necessity of providing suitable sealings between all of the relatively moving parts, as well as the constructive complication resulting from the various pieces comprising the mixer.

This invention is directed to provide a single-control type of hot and cold water mixer, the moving parts of which are made of ceramic material, such as sintered ceramic material, avoiding the use of seals between the relatively moving parts, and allowing to make such parts of extremely simple shapes, thus avoiding complicated machinings and reducing the mixer cost.

According to the invention, there is generally provided a single-control type of hot and cold water mixer, comprising a mixer body or casing defining inlet conduits for the hot water and a cold water conduit, opening towards a mixing chamber communicating with a water supply orifice, said chamber having therein a mixing unit operable by a control handle between a closing position, an opening position for hot or cold water delivery, and a mixing position, said mixing unit consisting of a fixed or stationary disc of ceramic material having first and second apertures communicating with the cold water inlet conduit and the hot water inlet conduit, respectively, and a movable cylindrical block of ceramic material sealingly sliding against a flat face of said disc, said block having a cavity opening towards said flat face and its side surface, respectively, to define a water passage between said inlet conduits to the mixing chamber, the width of the aperture in said block being larger than the distance or spacing between the disc apertures to communicate with either or partially with both of said disc apertures.

The cylindrical shape for both the disc and block and the use of ceramic material in making such members is convenient as said pieces can be made according to a very simple procedure and at a low cost. Additionally, the provision of a laterally open cavity on the cylindrical block allows to simplify the entire construction of the mixer body or casing, since the water inlets are in direct communication with the mixing chamber, thus avoiding any formation of complicated passages of difficult realization and that in any case would cause unavoidable losses of load. This is the reason because the operation of the mixer according to the invention is only slightly noisy.

The invention will be now described in further detail by mere way of example with reference to the figures of the accompanying drawings, in which.

Figure 1:
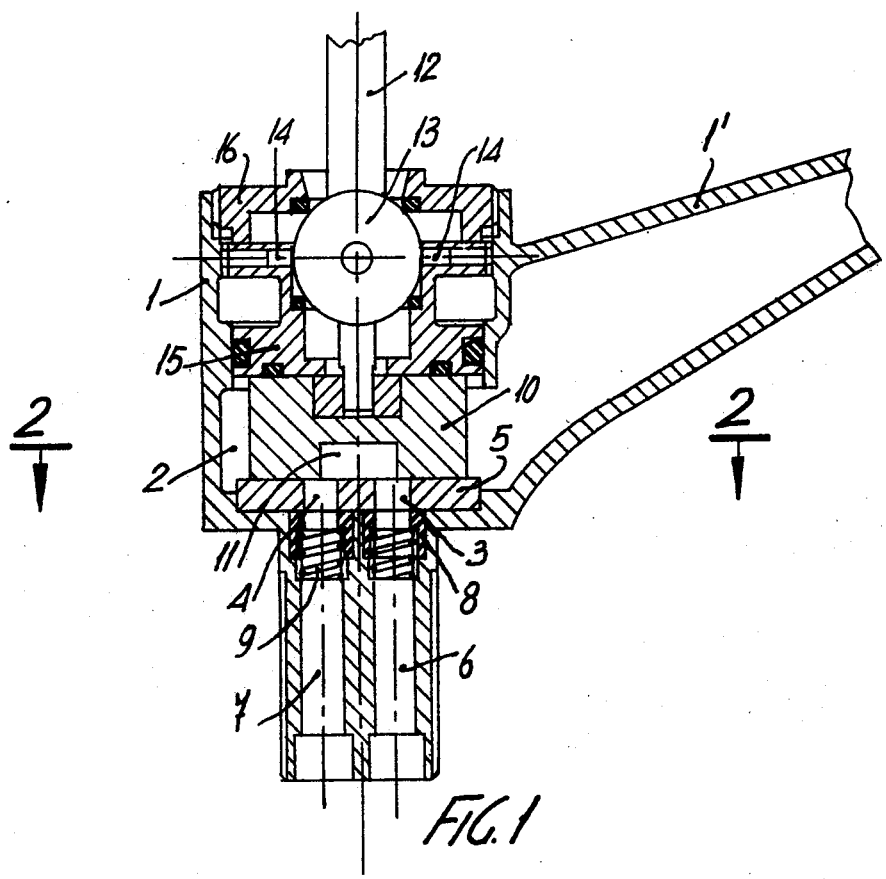
FIG. 1 is a diagrammatic longitudinal sectional view showing a general type of hot and cold water mixer according to the invention.
Figure 2:
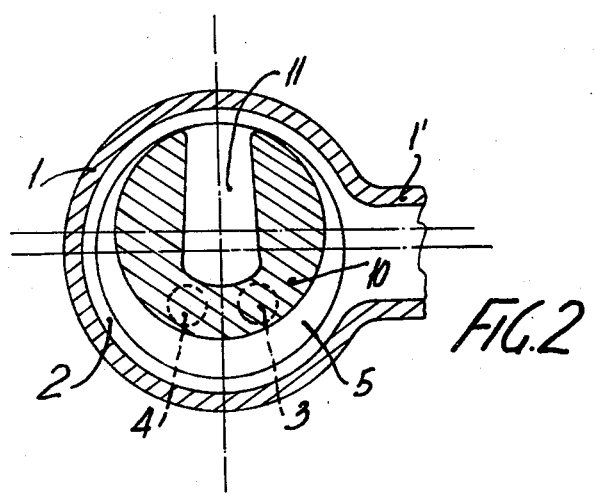
FIG. 2 is a cross-sectional view taken along line 2—2 of FIG. 1 and showing the mixer at closed position.

Referring to FIGS. 1 and 2, it will be seen that the mixer according to the invention comprises a body member or casing 1 defining at the bottom a mixing chamber 2, the latter communicating on one side through apertures 3 and 4 in a disc 5 of ceramic material with the cold water inlet conduit 6, the hot water inlet conduit 7 and respectively the hot, cold or mixed water delivery orifice 1' through a passage in a second cylindrical block 10.

More particularly, said disc 5 of ceramic material is fixed within a seating on the bottom of the mixer body member or casing 1, and has thoroughly smoothed faces for proper fluid sealings. Thus, sealing to inlet conduits 6 and 7 is ensured by annular seals or gaskets 8 that are urged against the disc face by springs 9.

A cylindrical block 10 of ceramic material is provided on the opposite side of disc 5 and has a fully smoothed flat lower face sealingly sliding against the similarly smoother upper face of disc 5.

Said block 10 of ceramic material has a transverse cavity 11 opening both to the flat underside of the block and to the side surface of the latter a fluid passage from the water inlet conduits 6 and 7 to the mixing chamber 2.

With respect to disc 5, this movable block 10 can take a first mixer closing position, shown in FIG. 2, at which the full or solid portion of block 10 will close both the water inlet apertures 3 and 4. Block 10 can take a second position, shown in FIG. 3, or an open position for cold water only, at which the above mentioned cavity 11 communicates with only the aperture 3 of the cold water inlet conduit 6. The position of maximum opening for cold water is shown in FIG. 3, but through a short forward movement of block 10, as provided by control handle 12, the flow of cold water can be reduced.

Figure 3:
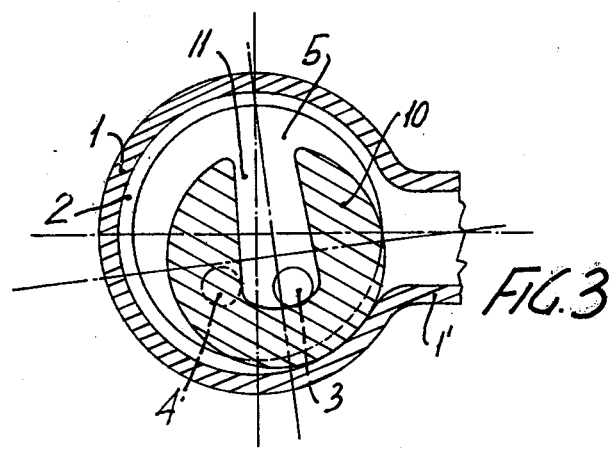
FIG. 3 is a sectional view similar to that of FIG. 2, but showing the mixer at open position for cold water.
Figure 4:
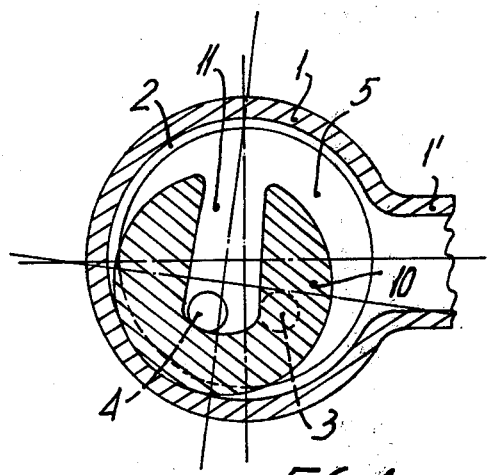
FIG. 4 is a sectional view similar to that of FIG. 2, but showing the mixer at open position for hot water.

As shown in FIG. 4, said block 10 can also take a hot water opening position, which position is opposite to that of FIG. 3. Also in this case, a forward movement of block 10 would reduce the hot water flow.

Figure 5:
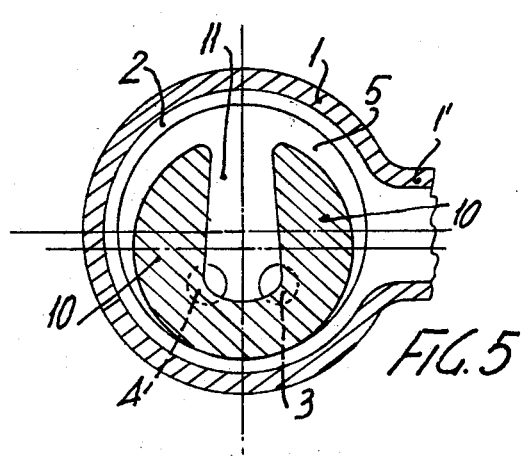
FIG. 5 is a sectional view similar to that of FIG. 2, but showing the mixer at its position for maximum delivery or output of mixed water.

Finally, FIG. 5 shows a position of block 10 for maximum mixing of cold water, at which position the cavity 11 of said block is in communication with both apertures 3 and 4 of the ceramic disc 5. As apparent, also in this case, the forward movement of block 10 would cause a reduction in the mixed water flow.

As above mentioned, the movement of block 10 is provided by a single control handle or knob 12 which through a ball-and-socket joint 13 and opposite pins 14 is articulated to a support or bearing 15, the latter being sealingly inserted in the body member or casing 1 on the ceramic block 10 and secured by means of a ring nut 16 which is screwed down in said body member or casing 1 so as to provide said block 10 with the required thrust sealing. Suitable seals or gaskets provide the required sealings to the mixer body member or casing.

Therefore, from the foregoing and as shown in the accompanying drawings it will be appreciated that the invention provides a single-control type of hot and cold water mixer, comprising few pieces of a simple construction and wherein the mixing unit is substantially replaced by a stationary ceramic disc and a movable ceramic block, contacting and sealingly sliding on said disc for communicating the hot and cold water inlet conduits both separately and jointly with a mixing chamber.

It should be understood that the subject herein described and shown with reference to the accompanying drawings has been given by mere way of example and that the shape of the mixer body member or casing, as well as the control system for the ceramic block, could be also modified with respect to those shown, without departing for this from the principle of the present invention.

What is claimed is:

1. A single-control type of hot and cold water mixer comprising a mixer body member or casing defining a hot water inlet conduit, a cold water inlet conduit, and a mixing chamber, said hot and cold water inlet conduits opening towards said mixing chamber, and a water delivery orifice in direct communication with said mixing chamber, a mixing unit positioned within said mixing chamber and operable between a closed position, a hot water or cold water open position, and a mixing position, said mixing unit comprising a one-piece disc of ceramic material fixedly mounted within said mixing chamber having first and second apertures only extending therethrough and in fixed fluid communication with said hot and cold water inlet conduits, respectively, and free of any outlet apertures, a movable block of ceramic material having a flat face sealingly slidable against a flat face of said disc, a control handle connected to said movable block to move said movable block in said mixing chamber with respect to said disc, said block having a cavity opening to said flat face and extending substantially radially to a side edge surface of said movable block to define a water passage from said inlet conduits to the mixing chamber that is exterior to said movable block, the width of the block cavity being larger than the distance or spacing between the apertures in said ceramic disc in order to communicate with either or partially with both the apertures in said disc.

* * * * *